(12) United States Patent
Yeomans

(10) Patent No.: US 6,272,823 B1
(45) Date of Patent: Aug. 14, 2001

(54) PREFORMED FRAME FOR A HEADER FOR A HARVESTING MACHINE

(75) Inventor: Sidney Wayne Yeomans, Milan, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/322,396

(22) Filed: May 28, 1999

(51) Int. Cl.[7] .............................. A01D 43/00; A01D 34/02
(52) U.S. Cl. ................................. 56/158; 56/364
(58) Field of Search ........................... 56/1, 12.7, 210, 56/208, 218, 158, 123, 125, 473, 364, 14.9, 10.2 E

(56) References Cited

U.S. PATENT DOCUMENTS 3,659,405 * 5/1972 Miller ..................................... 56/15.6
4,409,780 * 10/1983 Beougher et al. ...................... 56/228
4,487,004 * 12/1984 Kejr ....................................... 56/14.4
6,029,429 * 2/2000 Fox et al. ............................ 56/10.2 E

* cited by examiner

Primary Examiner—Thomas B. Will
Assistant Examiner—Meredith C. Petravick

(57) ABSTRACT

A preformed frame for a harvesting machine header having a main beam that is constructed of a single piece tube extending from end to end of the header. The single piece tube is preformed by vertically cutting the tube at a location intermediate the two ends and bending the tube to raise the ends upward and forward. A cap covers the top, front and rear walls of the beam and a gusset plate is placed on the bottom of the single piece tube at the location of the cut. The gusset plate, cap and single piece tube are welded together to hold the preformed shaped of the tube. When the header is supported above ground, the deflection brings the cutterbar, not the main beam, to a substantially straight and horizontal position.

15 Claims, 2 Drawing Sheets

# PREFORMED FRAME FOR A HEADER FOR A HARVESTING MACHINE

BACKGROUND OF THE INVENTION

1. Field of the Invention

The present invention relates to a header for a harvesting machine and in particular to a preformed header frame. When the header is supported above the ground intermediate the ends of the frame, loading of the frame deflects the ends of the frame to a position in which the cutterbar assembly along the frame front edge assumes a substantially straight and horizontal position.

2. Description of the Related Art

To increase harvesting efficiency, harvesting machines, such as combines, have increased in size and capacity over the years. With this increasing capacity, the detachable header used for picking a crop has increased in width as well. A wider header increases efficiency by reducing the number of passes through the field required by the harvesting machine to cover the entire field. However, the increased width of the header has resulted in increased difficulties in maintaining the cutterbar assembly at the front of the header in a straight orientation for proper operation. Headers are typically supported by the harvesting machine at a location in the middle of the header. When the header is suspended above the ground, the ends of the header tend to deflect downward under the load. As headers increase in width, it is harder to prevent this deflection. Deflection of the cutterbar assembly from a straight position will reduce the life of the knife back of the cutterbar assembly and the knife drive motor. In addition, if the ends of the cutterbar assembly are lower than the center portion, the reel will not be at a constant distance from the cutterbar across the entire length of the cutterbar assembly. Proper crop movement over the cutterbar will only occur over part of the header width.

Header manufacturers have taken various approaches to address this problem. One approach is to build a header frame with a main beam having multiple round tubes joined end to end with the center of the beam formed by larger tubes. A number of braces and gussets connect to the main beam to form a truss like structure to reduce the deflection. Another approach is to build a main beam in which lengthwise tube has a second tube placed thereon at a center portion of the longer tube. Gussets extending lengthwise from the ends of the second tube gradually reduce in section height toward the ends of the main beam. The individual pieces are welded together with the intent that the main beam will resist deflection under load. The use of gauge wheels at the outer ends of the header can also help control deflection.

SUMMARY OF THE INVENTION

It is an object of the present invention to provide a header having a preformed frame with a single tube main beam in which the ends of the main beam are raised upward and forward of an intermediate portion of the main beam so that when suspended, the deflection in the main beam returns the cutterbar assembly to a substantially straight and horizontal position.

The present invention provides a header frame having a main beam that is constructed of a single piece tube extending from end to end of the header. The single piece tube is preformed by vertically cutting the tube at a location intermediate the two ends. The tube is then bent to raise the ends upward and forward. A cap that covers the top, front and rear walls of the beam is placed over the main beam in the intermediate portion to cover the cut. A gusset plate is placed on the bottom of the single piece tube at the location of the cut. The gusset plate, cap and single piece tube are welded together to form a tube that is preformed. When the header is supported above ground, the deflection brings the cutterbar, not the main beam, to a substantially straight and horizontal position.

In a preferred embodiment, the single piece tube is vertically cut downward from the top surface through the top, front and rear walls. The cut extends partially in the bottom wall, from both the front and rear walls. The single piece tube is then bent upward and forward at the cut. The cap and gusset are shaped to fit the bent, single piece tube and are welded to the tube to maintain the preformed shape of the tube. The preformed shape not only counters the loading of the main beam but also counters the welding and hole punching effects on the beam.

DESCRIPTION OF THE PREFERRED EMBODIMENT

Figure 1:
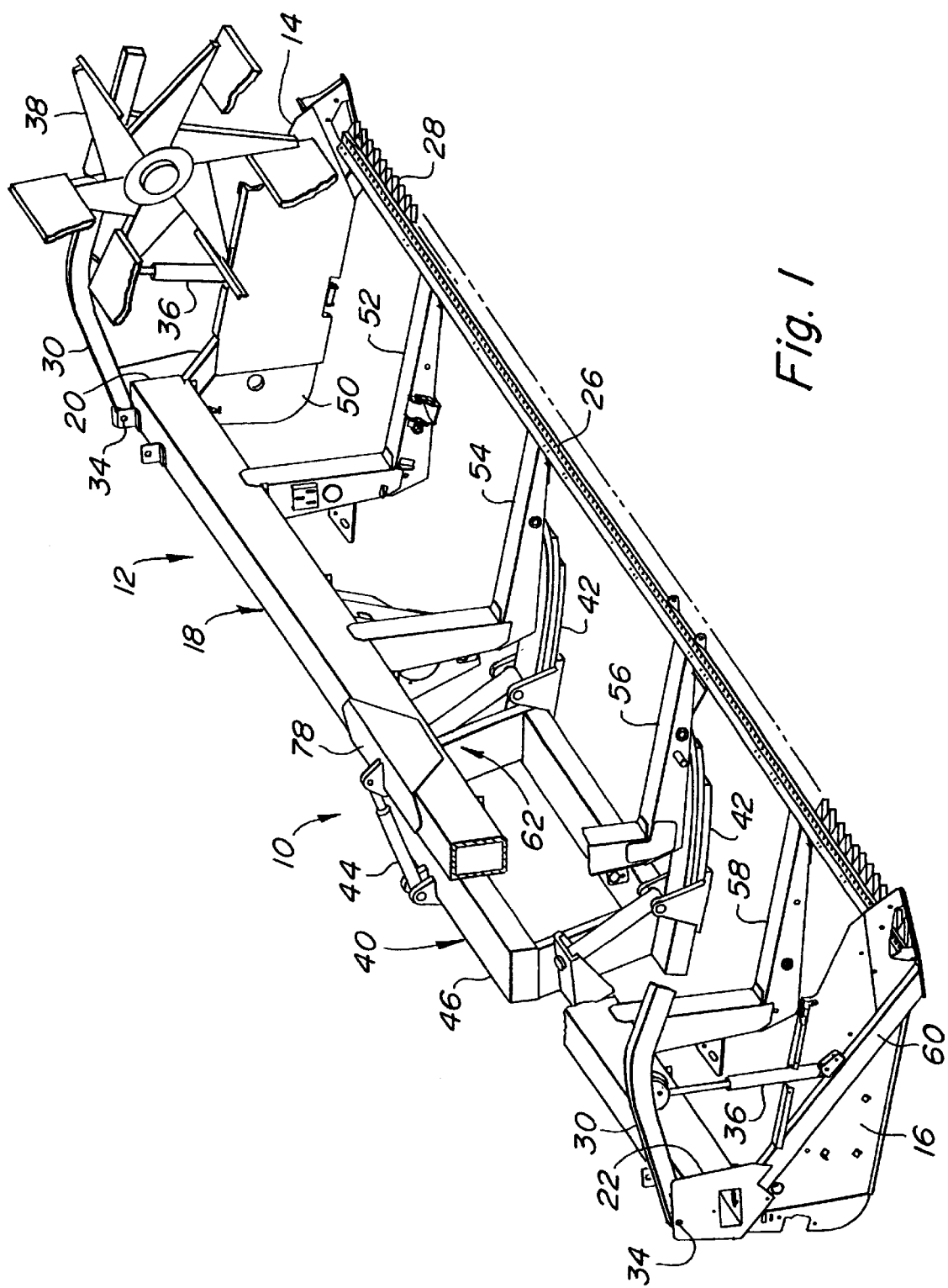
FIG. 1 is a perspective view of a preformed header frame according to the present invention.

The preformed header frame of the present invention is shown in FIG. 1 and designated generally at 10. The header frame includes a main frame, designated generally at 12 that extends between opposite ends 14, 16 of the header. The main frame 12 includes an elongated main beam 18 having opposite ends 20 and 22 at the ends of the header. The main frame further includes a plurality of frame members 50, 52, 54, 56, 58, 60 that extend downwardly and forwardly from the main beam to a lower front edge of the header formed by a cross member 26. A cutterbar assembly 28 is mounted to the front cross member 26 along the front edge of the header for cutting a standing crop.

The header is equipped with reel support arms 30 at opposite ends. The reel support arms 30 are pivotally connected to the main beam 18 by pins 34 in a conventional manner. The reel support arms 30 are each vertically positioned by a hydraulic cylinder 36. Each cylinder 36 extends between the reel support arms and the frame members 50, 60 at the outward ends of the header. A reel 38, only a portion of which is shown, is carried by the reel support arms in a conventional manner for a harvesting header.

The frame 10 includes an attachment frame 40 that is coupled to the main frame 12 at an intermediate location between the two outboard ends. The attachment frame 40 includes leaf springs 42 that extend forward and are coupled to the frame members 54, 56 to support the main frame thereon. In addition, a turnbuckle 44 couples the upper member 46 of the attachment frame to the main beam 18 of the main frame 12. The header 10 is mounted to a feeder house of a harvesting machine, such as a combine, by rigidly coupling of the harvesting machine feederhouse to the attachment frame 40. When the header 10 is mounted to a harvesting machine and lifted by raising of the attachment frame 40, the platform main frame 12 is suspended above the ground. Since the main frame is supported at an intermediate location, between the frame members 54 and 56, the outer ends of the main beam will tend to deflect downward under the load, particularly the load of the reel. In addition, because the reel is supported on the main frame forward of the main beam 18, the reel mounting load produces a torsional load on the main beam. The downward load and the torsional load on the main beam will result in the ends of the cutterbar assembly 28 being deflected downward and rearward relative to the center of the cutterbar assembly, producing a bow in the cutterbar assembly. This reduces the life of the cutterbar assembly and the cutterbar drive motor.

To prevent the detrimental effects of a bowed cutterbar assembly, the header of the present invention is constructed with the main beam 18 preformed in such a manner that the ends 20, 22 of the main beam are forward and upward relative to the intermediate portion 62 (FIG. 2) of the main beam. As a result, when the header is supported above ground by lifting of the attachment frame 40, the loading of the main beam will result in downward and rearward deflection of the main beam, bringing the cutterbar to a substantially horizontal and straight orientation. The main beam 18 may or may not assume a straight position.

Figure 2:
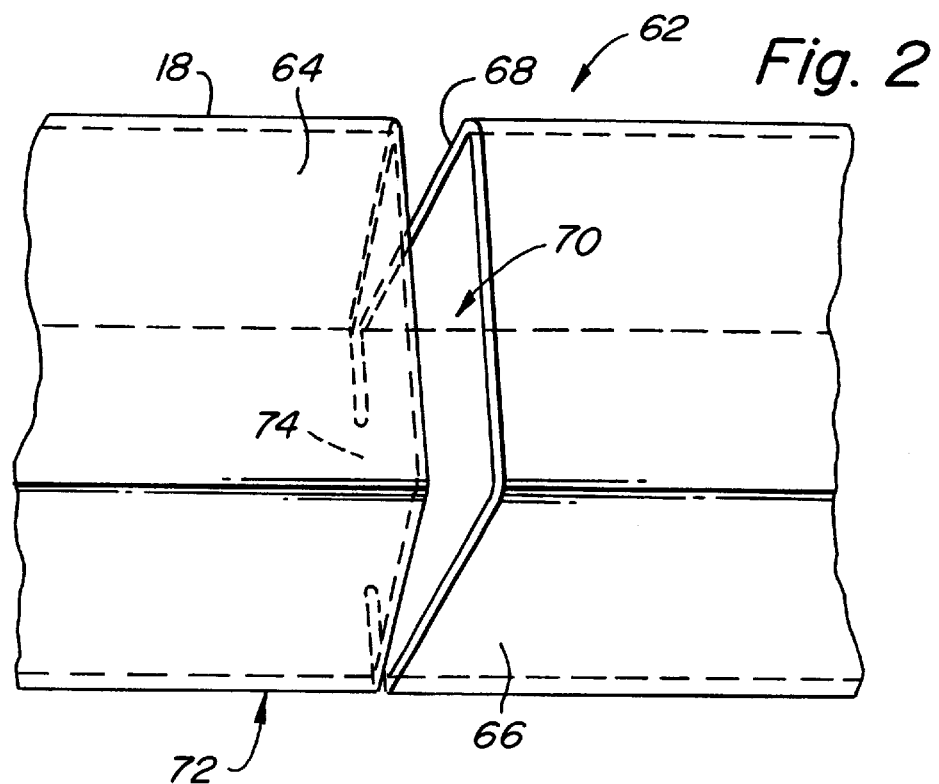
FIG. 2 is an enlarged perspective view of the tube forming the main beam showing the cut in the tube prior to preforming the tube.
Figure 3:
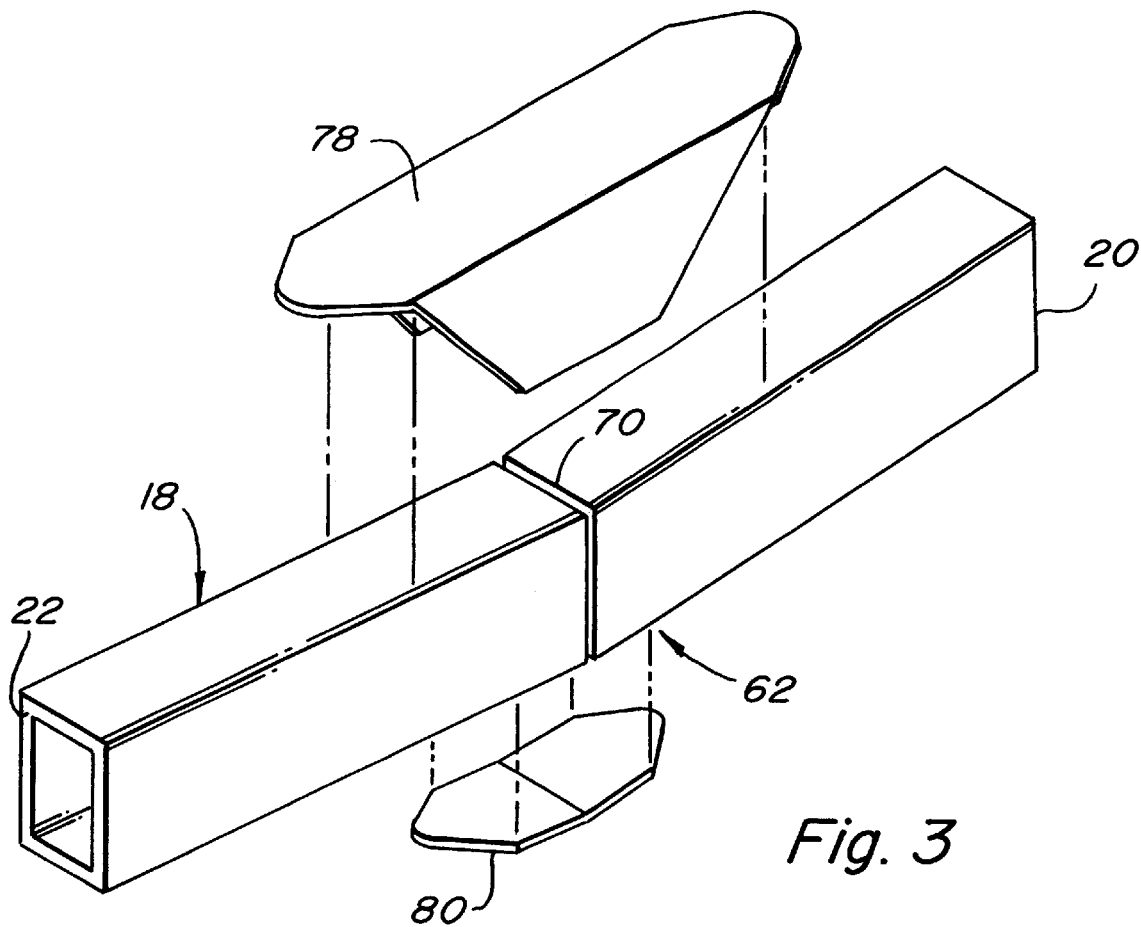
FIG. 3 is an exploded perspective view of the preformed main beam.

The main beam 18 is preformed by first cutting the beam as shown with reference to FIG. 2. The beam is cut at the intermediate portion by cutting downward through the top wall 64, the front wall 66, and the rear wall 68, forming a slot 70. In addition, the cut continues into the bottom wall 72 from each of the front wall 66 and rear wall 68. A center web portion 74 in the bottom wall remains uncut. The width of the slot 70 narrows near the lower end of the front and rear walls and into the bottom wall 72.

The beam is then bent at the slot 70 to raise the ends 20 and 22 and to move the ends forward of the intermediate portion 62. The deflection in the main beam 18 is held by a saddle cap 78 that is placed over the top of the beam, covering the top wall 64, front wall 66 and rear wall 68, adjacent the slot 70. In addition, a gusset plate 80 is placed on the bottom wall 72, overlying the slot cut into the bottom of the main beam. The saddle cap 78 and gusset 80 are both welded to the main beam. The frame members 50, 52, 54, 56, 58 and 60 are all welded to the main beam 18 with the result that, once completed, the front ends of the frame members 50 and 60 at the ends of the header extend slightly forward and upward, relative to the ends of the frame members 52, 54, 56, 58 intermediate the ends of the frame. The front cross member 26 is capable of being bent within the welding fixture to follow the preformed shape of the main beam 18 and the frame members 50, 52, 54, 56, 58 and 60.

The resultant frame structure utilizes a single piece tube to form the main beam 18. This is in contrast to other structures that utilize a multiple piece welded frame structure for the main beam. While in the preferred embodiment the ends of the main beam are preformed both forward and upward, the invention can be utilized in a beam in which the ends of the beam are only preformed upward. This can be used where there is little rearward deflection of the cutterbar assembly ends or where the rearward deflection does not have any detrimental effects.

The main beam 18 has been shown and described as an upper beam at the top of the support arms. The invention is not limited to a preformed upper beam but could be utilized in a header having a main beam at the lower, rear portion of the header. Accordingly, the invention should not be limited to the above-described embodiment, but should be limited solely by the claims that follow.

What is claimed is:

1. A harvesting header comprising:

a main frame extending transversely between opposite ends of the header, the main frame including an elongated main beam having opposite outboard ends at the ends of the header and frame members extending from the main beam to a lower front edge of the header;

a cutterbar assembly disposed along the lower front edge of the header for cutting a standing crop;

an attachment frame coupled to the main frame at an intermediate portion of the main beam, between the ends thereof, for supporting the main frame thereon; and the main beam including a single piece tube extending between the opposite ends of the main beam, the single piece tube being preformed to raise the ends of the main beam above the intermediate portion of the main beam and to raise the ends of the cutterbar assembly wherein when the header is supported above ground by lifting of the attachment frame coupled to the main frame at the intermediate portion of the main beam, loading of the main beam deflects the ends of the main beam downward, resulting in the cutterbar assembly along the front edge of the header assuming a substantially horizontal orientation.

2. The header as defined by claim 1 wherein the single piece tube has a vertical cut in the intermediate portion partially through the single piece tube and a bend at the location of the cut to raise the ends of the main beam, and wherein the main beam further comprises a cap member covering a portion of the single piece tube adjacent the cut, the cap being welded to the single piece tube to retain the preformed shape of the main beam with the ends thereof raised relative to the intermediate portion.

3. The header as defined by claim 2 wherein the single piece tube has a rectangular cross section with the cap overlying front, top and rear walls of the single piece tube.

4. The header as defined by claim 3 further comprising a gusset plate welded to a bottom wall of the single piece tube at the location of the cut.

5. The header as defined by claim 2 wherein the single piece tube is also bent to move the ends of the main beam both forward and upward relative to the intermediate portion of the main beam wherein when the header is supported above ground by lifting of the attachment frame, vertical loading and torsional loading of the main beam deflects the ends of the main beam downward and rearward and returns the ends of the cutterbar assembly downward and rearward to a substantially horizontal orientation and straight line position in a vertical plane.

6. The header as defined by claim 2 wherein the cut in the single piece tube extends downward from a top surface thereof.

7. The header as defined by claim 1 wherein the main beam is an upper beam at an upper, rear portion of the header with the frame members extending downwardly and forwardly from the upper beam to the lower front edge of the header.

8. A harvesting header comprising:

a main frame extending transversely between opposite ends of the header, the main frame including an elongated main beam having opposite outboard ends at the ends of the header and frame members extending from the main beam to a lower front edge of the header;

a cutterbar assembly disposed along the lower front edge of the header for cutting a standing crop;

an attachment frame coupled to the main frame at an intermediate portion of the main beam, between the ends thereof, for supporting the main frame thereon; and the main beam including a single piece tube extending between the opposite ends thereof, the single piece tube being preformed to raise the ends of the main beam above the intermediate portion and to move the ends of the main beam forward of the intermediate portion and to raise and move forward the ends of the cutterbar assembly wherein when the header is supported above ground by lifting of the attachment frame, loading of the main beam deflects the ends of the main beam downward and rearward, resulting in the cutterbar assembly along the front edge of the header assuming a substantially horizontal orientation and straight line position in vertical plane.

9. The header as defined by claim 8 wherein the single piece tube has a vertical cut in the intermediate portion partially through the single piece tube and a bend at the location of the cut to raise the ends of the main beam and move the ends of the main beam forward, and wherein the main beam further comprises a cap member covering a portion of the single piece tube adjacent the cut, the cap being welded to the single piece tube to retain the preformed shape of the main beam with the ends thereof raised and forward relative to the intermediate portion.

10. The header as defined by claim 9 wherein the single piece tube has a rectangular cross section with the cap overlying front, top and rear walls of the single piece tube.

11. The header as defined by claim 10 further comprising a gusset plate welded to a bottom wall of the single piece tube at the location of the cut.

12. The header as defined by claim 9 wherein the cut in the single piece tube extends downward from a top surface thereof.

13. The header as defined by claim 8 wherein the main beam is an upper beam at an upper, rear portion of the header with the frame members extending downwardly and forwardly from the upper beam to the lower front edge of the header.

14. A method of making a main frame for a harvesting header comprising:

providing a rectangular section tube for a main beam;

partially cutting the tube at an intermediate portion between opposite ends;

bending the tube at the cut to form a V-shaped tube with the ends of the tube vertically higher than the intermediate portion;

elastically deforming the tube in the horizontal direction to move the ends of the tube forward of the intermediate portion;

welding a channel member over a top portion of the tube and a plate on a bottom portion of the tube to maintain the formed shaped of the tube.

15. The method as defined by claim 14 wherein the tube is cut through a top wall, front wall and rear wall and partially through a bottom wall rearward from the front wall and forward from the rear wall.

* * * * *